(12) United States Patent
Ledet

(10) Patent No.: US 11,216,354 B2
(45) Date of Patent: Jan. 4, 2022

(54) DEPICTING OUTCOMES OF A DECISION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 270 days.

(21) Appl. No.: 16/442,901

(22) Filed: Jun. 17, 2019

(65) Prior Publication Data

US 2019/0361785 A1 Nov. 28, 2019

Related U.S. Application Data

(60) Provisional application No. 62/677,144, filed on May 28, 2018.

(51) Int. Cl.
| | |
|---|---|
| *G06F 11/34* | (2006.01) |
| *H04L 29/06* | (2006.01) |
| *G06F 16/687* | (2019.01) |
| *G06F 16/29* | (2019.01) |
| *G01C 21/00* | (2006.01) |
| *G01C 21/20* | (2006.01) |

(Continued)

(52) U.S. Cl.
CPC ........ *G06F 11/3457* (2013.01); *G01C 21/005* (2013.01); *G01C 21/206* (2013.01); *G06F 9/547* (2013.01); *G06F 16/23* (2019.01); *G06F 16/2358* (2019.01); *G06F 16/24565* (2019.01); *G06F 16/24578* (2019.01); *G06F 16/29* (2019.01); *G06F 16/687* (2019.01); *G06F 16/93* (2019.01); *G06F 16/9536* (2019.01); *G06F 40/166* (2020.01); *G06Q 10/1095* (2013.01); *G10L 25/51* (2013.01); *H04L 63/1416* (2013.01); *H04L 63/1441* (2013.01); *H04L 67/26* (2013.01); *G06K 9/00221* (2013.01); *G10L 17/00* (2013.01); *H04L 67/10* (2013.01); *H04L 67/42* (2013.01)

(58) Field of Classification Search
CPC ................ G06F 11/3457; G06F 16/23; G06F 16/24565; G06F 16/24578; G06F 16/9536; G06F 9/547; G06F 16/93; G06F 16/2358; G06F 40/166; G06F 16/687; G06F 16/29; G01C 21/005; G01C 21/206; G01C 21/3626; G01C 21/20; G10L 25/51; G10L 17/00; G06Q 10/1095; H04L 63/1408; H04L 67/26; H04L 63/1441; H04L 63/1416; H04L 67/10; H04L 67/42; G06K 9/00221
USPC ......................................................... 726/22
See application file for complete search history.

(56) References Cited

U.S. PATENT DOCUMENTS

| | | | |
|---|---|---|---|
| 8,091,065 B2 * | 1/2012 | Mir ........................ | G06Q 10/06 717/104 |
| 8,955,109 B1 * | 2/2015 | Satish ................... | G06F 21/577 726/22 |

(Continued)

*Primary Examiner* — Badri Narayanan Champakesan

(57) ABSTRACT

An example operation may include a method comprising one or more of sending, by a device, a notification message to a server, when a threat is determined on a device, developing a simulation to spread awareness of a situation in response to the sending, requesting, by the server, a permission to present the simulation to the device, sending, by the device, a response message in response to the requesting, and executing the simulation, by the server, when permission is granted on the device.

14 Claims, 10 Drawing Sheets

(51) Int. Cl.
*G10L 25/51* (2013.01)
*G06Q 10/10* (2012.01)
*H04L 29/08* (2006.01)
*G06F 16/93* (2019.01)
*G06F 16/23* (2019.01)
*G06F 40/166* (2020.01)
*G06F 16/2455* (2019.01)
*G06F 16/2457* (2019.01)
*G06F 16/9536* (2019.01)
*G06F 9/54* (2006.01)
*G06K 9/00* (2006.01)
*G10L 17/00* (2013.01)

(56) References Cited

U.S. PATENT DOCUMENTS

| | | | |
|---|---|---|---|
| 9,473,522 B1* | 10/2016 | Kotler | G06F 21/577 |
| 2008/0055305 A1* | 3/2008 | Blank | G06T 15/08 |
| | | | 345/419 |
| 2010/0027896 A1* | 2/2010 | Geva | G06K 9/72 |
| | | | 382/229 |
| 2013/0142365 A1* | 6/2013 | Lord | H04R 25/554 |
| | | | 381/312 |
| 2013/0144603 A1* | 6/2013 | Lord | G06F 40/58 |
| | | | 704/9 |
| 2014/0199664 A1* | 7/2014 | Sadeh-Koniecpol | |
| | | | G06F 21/563 |
| | | | 434/118 |
| 2015/0295948 A1* | 10/2015 | Hassell | H04L 63/1433 |
| | | | 726/25 |
| 2016/0036829 A1* | 2/2016 | Sadeh-Koniecpol | G06F 21/55 |
| | | | 726/23 |
| 2017/0034205 A1* | 2/2017 | Canedo | H04L 63/1416 |
| 2017/0103674 A1* | 4/2017 | Sadeh-Koniecpol | |
| | | | H04L 63/1433 |
| 2017/0140663 A1* | 5/2017 | Sadeh-Koniecpol | G09B 19/00 |
| 2017/0244746 A1* | 8/2017 | Hawthorn | G06F 21/55 |
| 2017/0270077 A1* | 9/2017 | Morard | H04L 67/32 |
| 2018/0124051 A1* | 5/2018 | Wang | H04L 63/0281 |
| 2018/0190146 A1* | 7/2018 | Bodnarium | G09B 5/00 |
| 2018/0233139 A1* | 8/2018 | Finkelstein | G06F 3/0304 |
| 2019/0155916 A1* | 5/2019 | Huang | G06F 16/248 |
| 2019/0171822 A1* | 6/2019 | Sjouwerman | G06F 30/20 |
| 2019/0341055 A1* | 11/2019 | Krupka | G10L 17/22 |
| 2019/0347585 A1* | 11/2019 | Mowatt | G06Q 10/0633 |

* cited by examiner

600

A threat has been identified that may have a severe impact to the organization if care is not taken. This threat comes in the form of an email with dangerous attachments.

[Example email with threat]

To help you realize the impact of this threat, the IT department will simulate the events that can occur if this threat is not attended to by sending a separate message to you if you agree below.

WARNING: The forthcoming email is not an actual virus, but a simulation. WARNING

To begin the simulation, [Click Here]. To ignore this, delete this email.

FIG.6

DEPICTING OUTCOMES OF A DECISION

TECHNICAL FIELD

This application generally pertains to the handling of threats in an environment and more specifically refers to the use of a simulation to depict possible outcomes of a threat prior to the threat occurring.

BACKGROUND

The current application builds upon the functionality introduced in a previous application that automatically targets content to online users. The application offers A system and method for automatically targeting online users are provided. A user performs an action that exhibits an interest in a product/service or performing a certain action, such as making a charitable contribution. A user record is created in a user management system, such as a customer relationship management database. The user record is augmented with additional data, such as data from a user profile, of the user, in a social network. Examples of such data include employer information, friend information, academic history, and job title. The augmented user record is provided to a targeted content system that assigns the user to a nurture flow that includes multiple segments, each segment associated with actions to perform relative to the user, such as sending certain content to the user through one or more delivery channels.

The current functionality builds on this application by depicting on a device a scenario wherein the scenario is good or bad that may result according to an action or inaction.

As content and notifications are received, there is a need for the entity issuing the data to provide the proper level of notice to help the receivers understand the consequences of ignoring the data. Perhaps a user would take different actions if he/she understood the possible result from not paying attention to the notice.

The current application seeks to overcome the problem inherent in the notification of critical threats and overall notifications by depicting the outcome of ignoring the notice on the device's display.

SUMMARY

An example operation may include a method comprising one or more of sending, by a device, a notification message to a server, when a threat is determined on a device, developing a simulation to spread awareness of a situation in response to the sending, requesting, by the server, a permission to present the simulation to the device, sending, by the device, a response message in response to the requesting, and executing the simulation, by the server, when permission is granted on the device.

Another example operation may include a system comprising a computing device that contains a processor and memory, wherein the processor is configured to perform send, by the computing device, a notification message to a server, when a threat is determined on the computing device, develop a simulation to spread awareness of a situation in response to the send, request, by the server, a permission to present the simulation to the device, send, by the device, a response message in response to the request, and execute the simulation, by the server, when permission is granted on the device.

A further example operation may include a non-transitory computer readable medium comprising instructions, that when read by a processor, cause the processor to perform sending, by a device, a notification message to a server, when a threat is determined on a device, developing a simulation to spread awareness of a situation in response to the sending, requesting, by the server, a permission to present the simulation to the device, sending, by the device, a response message in response to the requesting, and executing the simulation, by the server, when permission is granted on the device.

BRIEF DESCRIPTION OF THE DRAWINGS

FIG. 6 is a sample message of a notice of simulation in one embodiment of the present disclosure.

DETAILED DESCRIPTION

It will be readily understood that the instant components and/or steps, as generally described and illustrated in the figures herein, may be arranged and designed in a wide variety of different configurations. Thus, the following detailed description of the embodiments of at least one of a method, system, component and non-transitory computer readable medium, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Figure 1:
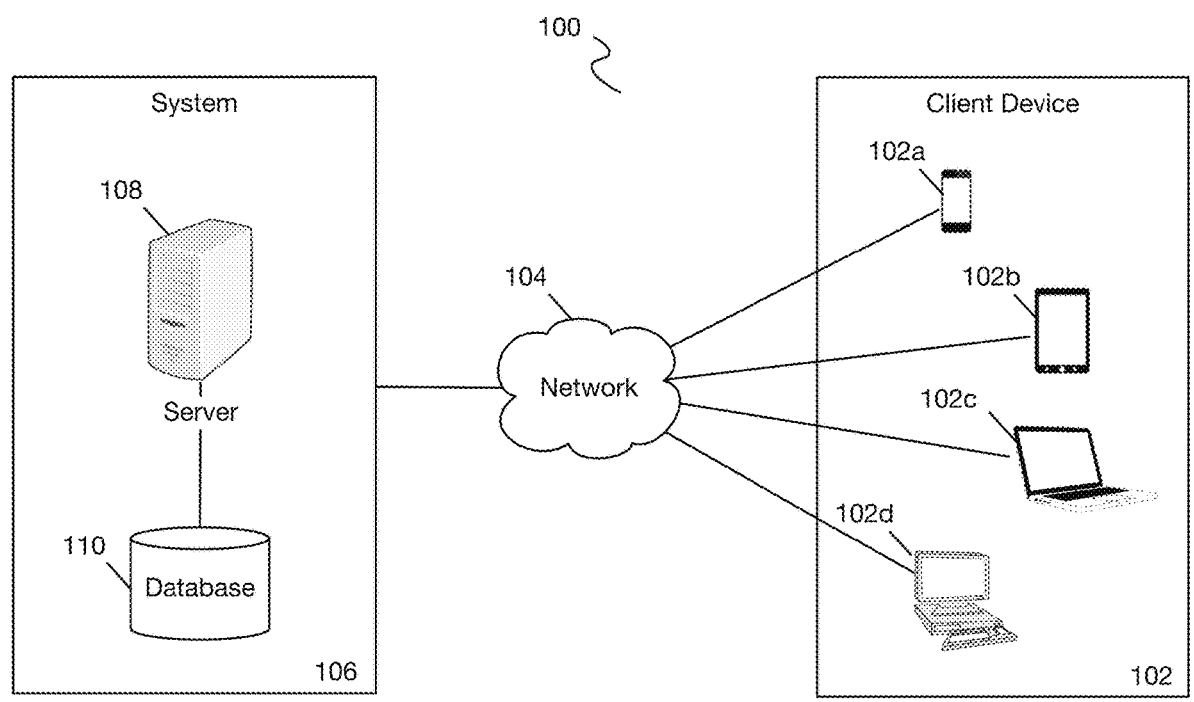
FIG. 1 is a system diagram in one embodiment of the present disclosure.

FIG. 1 illustrates a system diagram in one embodiments of the current application 100 in accordance with the present disclosure. There exist two main entities in the system diagram: a list of client devices 102 and a system 106. The client devices may be at least one of a mobile device 102, a tablet 102, a laptop device 102c and/or a personal desktop computer 102d. The client device is communicably coupled to the network 104, which is also communicably coupled to a system 106.

It should be noted that other types of devices might be used with the present application. For example, a PDA, an MP3 player, or any other wireless device, a gaming device (such as a hand held system or home based system), any computer wearable device, and the like (including a P.C. or other wired device) that may transmit and receive information may be used with the present application. The client device may execute a user browser used to interface with the network 104, an email application used to send and receive emails, a text application used to send and receive text messages, and many other types of applications. Communication may occur between the client device and the network 104 via applications executing on said device and may be applications downloaded via an application store or may reside on the client device by default. Additionally, communication may occur on the client device wherein the client device's operating system performs the logic to communicate without the use of either an inherent or downloaded application.

System 106 contains a server 108 communicably coupled to a database 110. Although not depicted herein, the server 108 may also reside in a remote location coupled to the network 104 and may be redundant. The database 110 may also be redundant and may be located outside of the system 106

Figure 2:
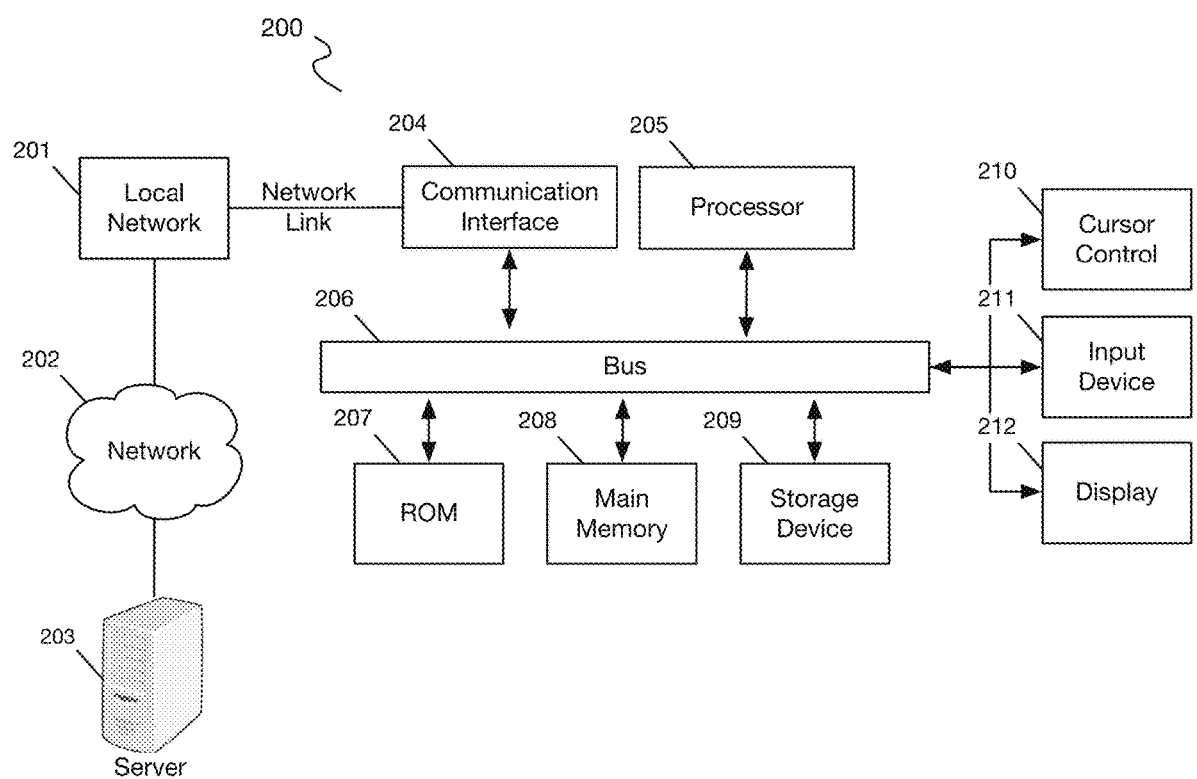
FIG. 2 is a block diagram of a computer system in one embodiment of the present disclosure.

FIG. 2 is a block diagram illustrating a computer system 200 upon which embodiments of the current invention may be implemented, for example. The computer system 200 may include a bus 206 or other communication mechanism for communicating information, and a hardware processor 205 coupled with bus 206 for processing information. Hardware processor 205 may be, for example, a general purpose microprocessor, for example.

Computer system 200 may also include main memory 208, such as a random access memory (RAM) or other dynamic storage device, coupled to bus 206 for storing information and instructions to be executed by a processor 205. Main memory 208 also may be used for storing temporary variables or other intermediate information during the execution of instructions to be executed by a processor 205. Such instructions, when stored in the non-transitory storage media accessible to processor 205, may render computer system 200 into a special-purpose machine that is customized to perform the operations specified in the previously stored instructions.

Computer system 200 may also include a read only memory (ROM) 207 or other static storage device which is coupled to bus 206 for storing static information and instructions for processor 205. A storage device 209, such as a magnetic disk or optical disk, may be provided and coupled to bus 206 which stores information and instructions.

Computer system 200 may also be coupled via bus 206 to a display 212, such as a cathode ray tube (CRT), a light-emitting diode (LED), etc. for displaying information to a computer user. An input device 211 such as a keyboard, including alphanumeric and other keys, is coupled to bus 206, which communicates information and command selections to processor 205. Other type of user input devices may be present including cursor control 210, such as a mouse, a trackball, or cursor direction keys which communicates direction information and command selections to processor 205 and controlling cursor movement on display 212.

According to one embodiment, the techniques herein are performed by computer system 200 in response to a processor 205 executing one or more sequences of one or more instructions which may be contained in main memory 208. These instructions may be read into main memory 208 from another storage medium, such as storage device 209. Execution of the sequences of instructions contained in main memory 208 may cause processor 205 to perform the process steps described herein. In alternative embodiments, hard-wired circuitry or embedded technology may be used in place of or in combination with software instructions.

The term "storage media" as used herein refers to any non-transitory media that may store data and/or instructions causing a machine to operation in a specific fashion. These storage media may comprise non-volatile media and/or volatile media. Non-volatile media may include, for example, optical or magnetic disks, such as storage device 209. Volatile media may include dynamic memory, such as main memory 208. Common forms of storage media include, for example, a hard disk, solid state drive, magnetic tape, or other magnetic data storage medium, a CD-ROM, any other optical data storage medium, any physical medium with patterns of holes, a RAM, a PROM, and EPROM, a FLASH-EPROM, NVRAM, any other memory chip or cartridge.

Various forms of media may be involved in the carrying one or more sequences of one or more of the instructions to processor 205 for execution. For example, the instructions may initially be carried on a magnetic disk or solid-state drive of a remote computer. The remote computer may load the instructions into its dynamic memory and send the instructions over a medium such as the Internet 202.

Computer system 200 may also include a communication interface 204 coupled to bus 206. The communication interface may provide two-way data communication coupling to a network link, which is connected to a local network 201.

A network link typically provides data communication through one or more networks to other data devices. For example, the network link may provide a connection through local network 201 to data equipment operated by an Internet Service Provider (ISP) 202. ISP 202 provides data communication services through the worldwide packet data communication network now commonly referred to as the "Internet" 202. Local network 201 and Internet 202 both use electrical, electromagnetic, or optical signals that carry digital data streams. The signals through the various networks and the signals on network link and through communication interface 204, carrying the digital data to and from computer system 200, are example forms of transmission media.

Computer system 200 can send messages and receive data, including program code, through the network(s) 202, the network link, and the communication interface 204. In the Internet example, a server 203 may transmit a requested code for an application program through Internet 202, local network 201 and communication interface 204.

Processor 205 can execute the received code as it is received, and/or stored in storage device 209, or other non-volatile storage for execution at a later time.

Every action or step described herein is fully and/or partially performed by at least one of any element depicted and/or described herein.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first", "second", and "third" may be used to differentiate elements, but the modifiers do not necessarily indicate any particular order. For example, a first party may be so named although, in reality, it may be a second, third, and/or fourth party.

In a US application 2016/0267544, henceforth referred to as the '544 application, a system and method is introduced wherein a user enters in information on a web page including the user's name, email address, social network identifier, etc. A sales representative views the user's action, such as purchasing a product or service. The user's information is augmented with additional information from social network(s) to assist the user's actions.

The current application builds upon the functionality introduced in the '544 application by depicting on a device a scenario wherein the scenario is good or bad that may result according to an action or inaction.

As content and notifications are received, there is a need for the entity issuing the data to provide the proper level of notice to help the receivers understand the consequences of ignoring the data. Perhaps a user would take different actions if he/she understood the possible result from not paying attention to the notice.

The current application seeks to overcome the problem inherent in the notification of critical threats and overall notifications by depicting the outcome of ignoring the notice on the device's display.

Computer users at an alarming pace in the today's technological environment receive different content and notifications. The content and notifications may be from an organization where they are employed, from organizations wherein computer programs and/or applications have been obtained, from organizations wherein operating systems are currently in use, or any other similar source.

It may be difficult for user of computers to ascertain the criticality of a given content or notification. Often, the ignoring of a notice does not bring about a consequence, especially a severe consequence, thus enhancing the possibility of ignoring future notices.

Information Technology (IT) organizations may become concerned that potentially critical threats are ignored such that the results of ignoring the threats may allow for great damage to a computer, a network, a user's identity, hardware, software, etc.

Different solutions are in place to describe a particular threat. For example, the Cyber Alert Level Indicator issued by the government provides an extreme example to depict a threat and possible ramifications of the threat:

Severity=(Criticality+Lethality)−(System Countermeasures+Network Countermeasures) Criticality 5 Core services such as critical routers, firewalls, VPNs, IDS systems, DNS
4 E-mail, web, database and critical application servers.
3 Less critical application servers.
2 Business desktop systems.
1 Home users.

Lethality
5 Exploit exists. Attacker could gain root or administrator privileges.
4 Exploit exists. Attacker could gain user level access privileges.
3 No known exploit exists. Attacker could gain root or administrator privileges.
2 No known exploit exists. Attacker could gain user level access privileges.
1 No known exploit exists. Attacker could not gain access.
System Countermeasures
5 Current operating system with applicable patches applied.
4 Current operating system with applicable patches applied.
3 Current operating system with fairly up-to-date patches applied.
2 Current operating system but missing some applicable patches.
1 Older operating systems including Windows NT 3.51, Solaris 2.6, Windows 95/98/ME.
Network Countermeasures
5 Restrictive (i.e. deny all except what is allowed) firewall.
4 Restrictive firewall.
3 Restrictive firewall. E-mail gateway filters common executable attachments.
2 Permissive firewall (i.e. "accept all but") or allowed service (e.g. HTTP, SMTP, etc.)
1 No firewall implemented. E-mail gateway does not filter any attachments.
Alert Indicator—Severity

| −8 to −5 | Green |
| −4 to −2 | Blue |
| −1 to +2 | Yellow |
| +3 to +5 | Orange |
| +6 to +8 | Red |

Figure 3:
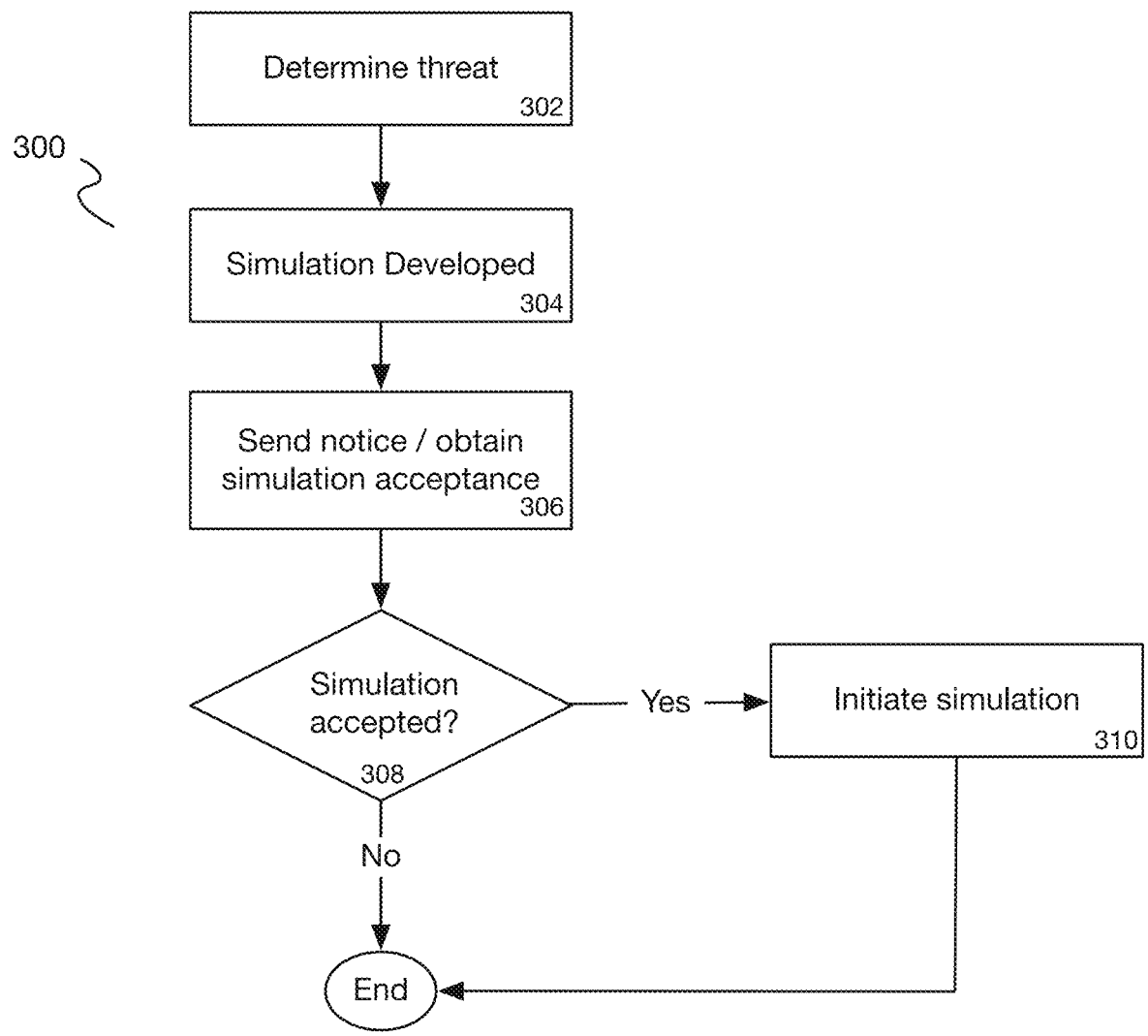
FIG. 3 is a flowchart of the current functionality in one embodiment of the present disclosure.

FIG. 3 shows a flow of the overall functionality of the current application in one implementation 300. A threat or a potential threat is determined. This threat may be software in nature or a non-software related threat. Regardless of the type of threat, it is determined to utilize the current application to spread awareness of the situation 302.

In one embodiment, a simulation is developed 304 outside of the current application. The simulation may be developed by the use of tools utilizing the tools presented herein, such as the Remote Framebuffer (RFB) protocol. The simulation may involve the server such as server 108 obtaining control of the mouse pointer of the client 102 wherein control is temporarily removed from the user. Other types of simulations are possible, an animated slide show designed in a slide generation program, an animation presentation depicting the scenario, a video presentation, a presentation of images in a slideshow presentation, etc. An outside node creates the presentation and the stored presentation is accessible via the current application. The simulation is developed and stored at the server 108 and/or the database 110. This includes designing and producing a software-based presentation which may be an animation, video, audio, or a remote simulation where the simulation moves the device's pointing device such that it appears to the user that the device has been taken over by an outside entity, or the like.

A message is sent to the client device 102 of the proposed recipient of the simulation wherein the recipient may accept or deny the execution of the simulation. Acceptance or denial of the simulation may occur through the use of components on the notification, a choice of clickable links, or the like.

If a GUI component is used for the acceptance or denial of the request to execute the simulation, upon the clicking of a "Yes" component, such as button component, an event is thrown that is caught by a method that sends a response message to the server 108.

If a URL link was provided in the message to initiate the simulation, the URL points to a file initiating the simulation wherein the file is stored on the server 108, the database 110, or another, remote file on a server coupled to the network 104. If the link is selected 308, the simulation begins 310.

A response message is received at the server 108 in the scenario wherein a GUI component was utilized to allow a response to the initiation of the scenario in message1 wherein the response message contains data reflecting the positive or negative response of the proposal to execute a simulation on the device 102.

If the response is positive 308, the simulation begins 310 and the process ends. If the response is negative, the process ends.

Technology exists that allows a user to display information on or to control another person's computing device. Some of the technologies are depicted herein, but one versed on computer design and development will be able to design other solutions while arriving at the same experience without deviating from the scope of the current application.

Remote Framebuffer (RFB) is a simple protocol for remote access to graphical user interfaces. Because it works at the framebuffer level it is applicable to all windowing systems and applications, including X11, Windows 3.1/95/NT and Macintosh.

Figure 4:
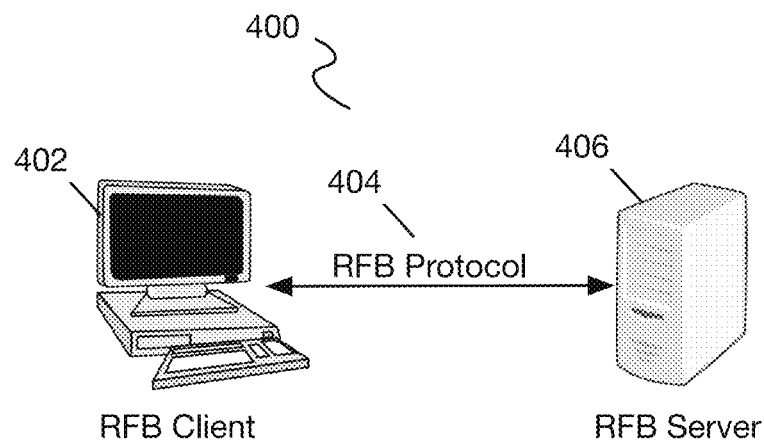
FIG. 4 is one implementation of the transfer system depicting the network of the RFB protocol in one embodiment of the present disclosure.

FIG. 4 is one implementation of the transfer system depicting the network of the RFB protocol 400.

The RFB client 402 is the remote endpoint receiving the input and may be a computer such as desktop computer, a laptop, a mobile device, or any device containing a processor and memory. The RFB client is the computer that wants to control the remote computer. The RFB client is stateless in nature allowing relatively easy implementation therein.

The RFB server 406 is the endpoint where changes to the framebuffer originate (i.e. the windowing system and applications). The RFB server is the computer that has the image to send to the client(s).

The RGB protocol 404 allows the creation and sending of screenshots (images) to a remote user after compressing the image. Use the Remote Framebuffer (RFB) protocol, which utilizes an RFB server and RFB client. The protocol also makes the client 402 stateless. If a client 402 disconnects from a server 406 and subsequently reconnects to that same server, the state of the user interface is pre-served. Furthermore, a different client endpoint can be used to connect to the same RFB server 406. At the new endpoint, the user will see exactly the same graphical user interface as at the original endpoint. In effect, the interface to the user's applications becomes completely mobile. The protocol allows for seamless interaction between multiple clients that have access to a network, such as network 104.

Above all, the process of obtaining access to a client device 102 without the user's acknowledgement is a tangent from the proper software design. Permission must be given before another entity (e.g. the server 108) has the ability to control the device.

For this reason, the current application seeks permission in the form of a first message sent to the device 102 wherein the user is made aware of the event that will unfold if permission is granted.

As mentioned herein, there are at least two methods discussed that allow the device to acknowledge the simulation and provide verification that the simulation may proceed:

A URL link that is associated with a file such that the simulation is initiated.

A GUI component such as a button that, when clicked on by the pointing device, sends a message to the server 108 wherein the simulation begins.

In either of the above cases, and those implemented that as similar to the above, it is assumed that permission is granted for a remote entity to (temporarily) control the device 102.

In one embodiment, the pointing of the device is controlled by the current application executing on a device remotely located to the client device 102, such as the server 108.

To take control of the remote device, there are multiple paths of development wherein the device (e.g. server 108) may traverse:

The current application executing on the client device 102 listens for a connection on the Transmission Control Protocol/Internet Protocol (TCP/IP) port wherein the server 108 sends messages to the same port using a connection protocol such as via implementing the Socket class. The application executing on the client device 102 receives these messages, parses them and provides the actions as specified in said messages, such as the movement of a pointer (e.g. mouse pointer), execution of a local or remote file (e.g. a simulation executable file, a video file, etc.), or other actions that are part of the simulation. This method also entails implementing an encryption or an authorization function to avoid a $3^{rd}$ party controlling the device when sending unauthorized messages to the same port.

The current application creates a Remote Desktop Protocol (RDP) connection wherein the server 108 controls the device 102 via the RDP connection. While this is possible, it is a more involved solution and requires a deep level of authorization from the device.

Another method is to build the current application executing on the client device 102 to accept Hypertext Transfer Protocol (HTTP) messages via the previously mentioned RDP protocol.

Figure 5:
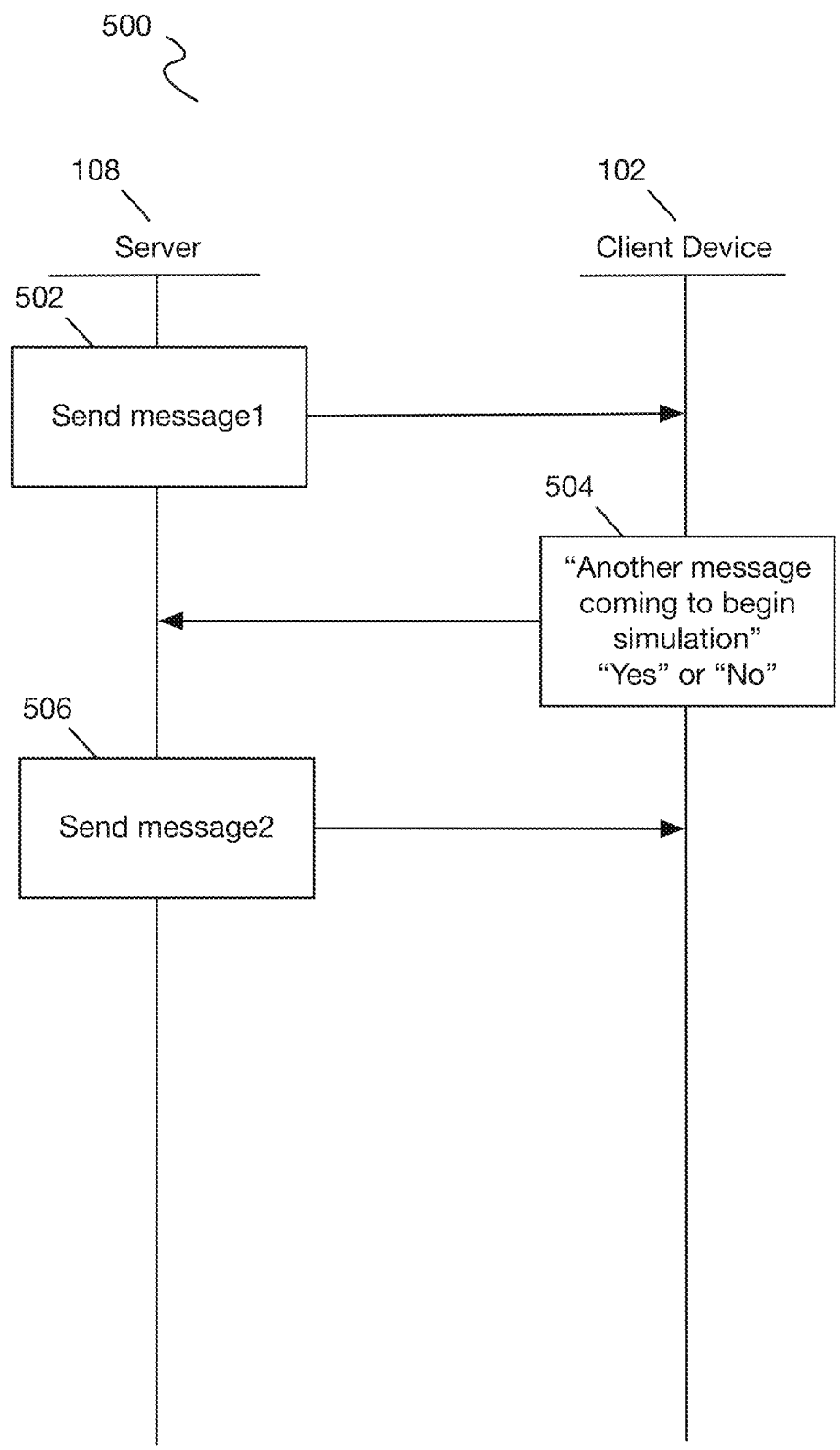
FIG. 5 is a second flowchart in one embodiment of the present disclosure.

FIG. 5 shows a flow of the current application in one implementation of the current application 500. The server 108 sends message1 502 such as an email to the client device 102. The text in the message1 504 contains text in FIG. 6, for example.

FIG. 6 shows the message 600 that introduces a simulation that will take effect upon an agreement accepted by the reader. The reader must click the link: [Click Here] to invoke the simulation. The reader may also ignore the message wherein the simulation will not occur.

If the reader accepted the simulation by clicking on the link 600, then a response is sent to the server 108. If the reader chooses, message1 is ignored or deleted wherein no further processing is performed.

In one embodiment, the simulation involves the reception of a message, such as an email. This message (message2) is the initial message of the simulation and is sent to the reader 506, such as the client device 102 of the reader.

Upon reception of the second message, the simulation commences 508 on the client device 102 of the reader.

The simulation is created by the system 106, more particularly the server 108. The simulation may be stored in database 110, for example. The simulation may involve the mouse pointer of the client device 102 taken control by the simulation or may be a video shown on the display of the client device.

In one embodiment, the simulation depicts events that may occur if the threat is not attended to. This may include at least one of the following:

a propagation of a virus received in a message such as an email. The simulation controls the pointing device on the client device 102 such that the pointing device moves over a link in a message and simulates a clicking on the link initiating the virus. Images and/or videos in the simulation depict a computer that is infected wherein the computer access the person's contact list then copies the infected message and sends the message to other users within the organization without the user's knowledge. This propagation may be visually depicted via the simulation wherein a birds-eye view of the organization is shown with all users in the organization reflected as a black dot. As the infection presents itself at each user, the dot becomes yellow as the virus engages with the computer then accesses their contact list and finally, at full infection, becomes red. This propagation expands until most if not all of the users within the organization are compromised.

a propagation of organizational trade secrets such as the effect of the current organization's falling stock price, images of headlines depicting internal trading, falling profit margins due to a lack of loyalty from the market, etc.

a depiction of the outcome of lower sales from a product such as a software product because of a bug that was released into the market causing a major glitch in the system, such as in the billing code.

The above list provides examples of the simulations with the understanding that any organization will be able to utilize the current application to shed light, in a visceral technique, to an increasing insensitivity to threats, or the lack of daily adherence to quality in the job/product at hand.

Figure 7:
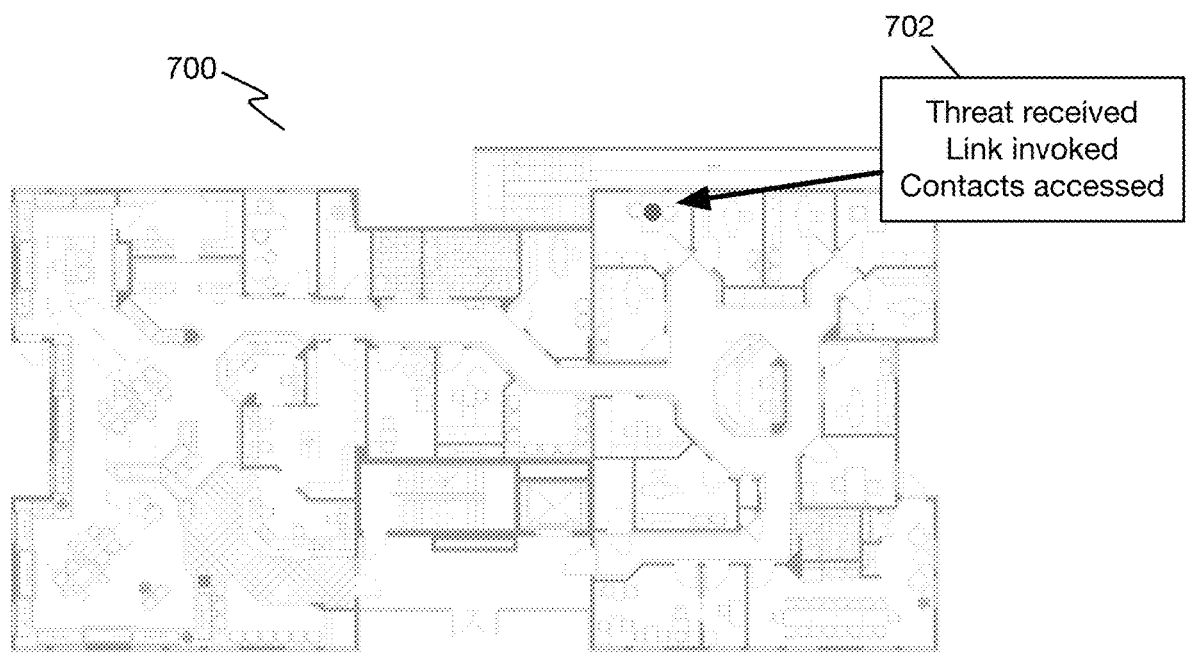
FIG. 7 is a first screenshot of a possible simulation in one embodiment of the present disclosure.

FIG. 7 is a first screen shot of a possible simulation of one implementation of the current application 700. The simulation may incorporate animation wherein the progression of the simulation is fluid in nature.

The single red dot indicates the point of entry of the threat into the organization 702. The link initiating the thread has been invoked (e.g. by the clicking of a link for example), and the user's contacts have been accessed.

Figure 8:
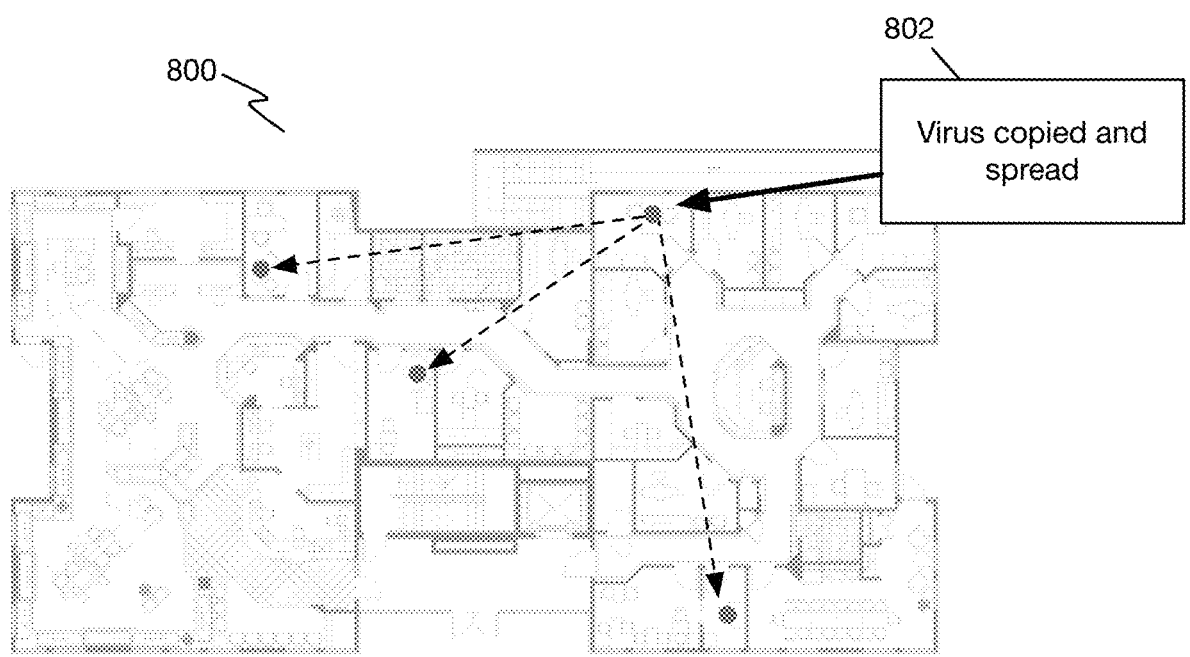
FIG. 8 is a second screenshot of a possible simulation in one embodiment of the present disclosure.

FIG. 8 is a second screen shot of a possible simulation of one implementation of the current application 800. The simulation depicts the spreading of the virus as indicated by the additional dotted lines, and the recipients as indicated by the 3 red dots.

The virus has been copied and spread 802 via the access to the initial user's contact list, for example.

Figure 9:
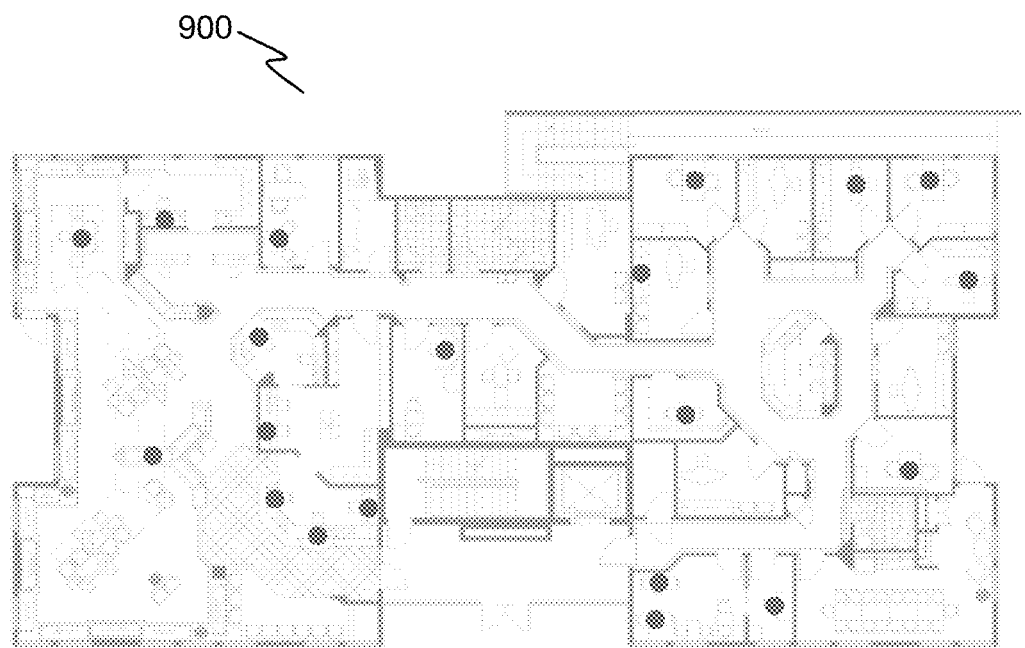
FIG. 9 is a third screenshot of a possible simulation in one embodiment of the present disclosure.

FIG. 9 is a third and final screen shot of a possible simulation of one implementation of the current application 900. The simulation depicts the spreading of the virus as indicated by the additional red dots indicative of the virus having spread among many users in the organization.

In another embodiment, the current application depicts a positive outcome resulting from decisions made. This embodiment covers the situation wherein an organization desires to relay the positive results from people in the organization paying attention to details that are easy to overlook, as they often become mundane tasks.

By initiating a simulation via the current application, it is possible to remind people in the organization that their everyday tasks are rewarded by elements that may not be reflected upon in their day-to-day environments.

For example, if an organization is seeking compliance from an authorized entity, such as ISO 9000 certification, the compliance needs often require conformance to detailed standards such as detailed document keeping, proving quality management standards. These requirements often are reluctantly maintained by personnel such that, after a period of time, the overall need of the requirement may be lost.

The current application may be used to remind the organization of the positive effects of compliance to a standard through the simulation showing positive results such as:

An increased in positive customer relations
An increased stock price
Additional customers via word of mouth
Less attrition
An increase in employee satisfaction
A greater chance of pay increases and mobility within the organization
Etc.

Other scenarios may easily be thought of and implemented through the depiction of both positive and negative results from actions and/or inactions of people within an organization without deviating from the scope of the current application.

As another embodiment, the current application depicts both positive and negative outcomes in a transport, based on a current situation.

The transport may be an automobile, airplane, train, bus, boat, or any type of transport that normally transports people from one place to another.

For example, the current application executing in a device, henceforth referred to as the transport computer inside the transport such as part of the navigation system, the entertainment system, or as a new computing device detects the current speed of the transport in a situation, such as traveling down an interstate road for example. The transport computer is any device containing a processor and memory and may be integrated into a computing device in the transport.

The current speed is used to initiate the logic of the current application wherein if the transport is traveling a lower rate of speed, a simulation is presented to the user indicating positive aspects of traveling at a lower rate of speed, and if the transport is traveling at a higher rate of speed, a simulation is presented to the user indicating the possible critical outcomes of traveling at a high rate of speed.

For example, the simulation shows pictures of a transport in a high-speed crash or shows a video of a person writing a transport insurance bill payment that reflects the bill after X number of speeding tickets, etc.

In another embodiment, a picture is taken of the front of the transport via a camera mounted at the front of the transport as is normally used in today's market, then superimposed over that image is a picture of the user's transport crashed into that transport. The superimposing of an image on another image is either performed at the transport computer, or remotely at a server such as server 108 wherein messaging occurs between the transport computer and the server through the network 104.

As another example, the simulation shows calculations based on the average speed of the transport and a display of the amount of money saved on gasoline by traveling at a lower rate of speed. This calculation can be depicted per month, year and the savings obtained over a long period of time, such as a decade. The transport computer interfaces with APIs of applications that allow the querying of current gasoline prices to determine the current gasoline price. The transport computer then calculates the amount of savings that may be incurred if the transport travels at a lower speed, such as 60 mph, then compares that value to the amount of gasoline used if the transport travels at a faster speed, such as 80 mph. This data is presented to the user via a display on the transport computer, for example.

The current application may easily determine the rate of speed via interaction with the transport's onboard computer, for example.

In another embodiment, the simulation may be presented to the user on a Heads Up Display (HUD) device such that the user may continue to operate the transport while still pay some attention to the simulation.

In another embodiment, the simulation may be presented on a mobile device, such as the client device 102 wherein the communication between the transport computer and the client device is via Bluetooth, for example.

Figure 10:
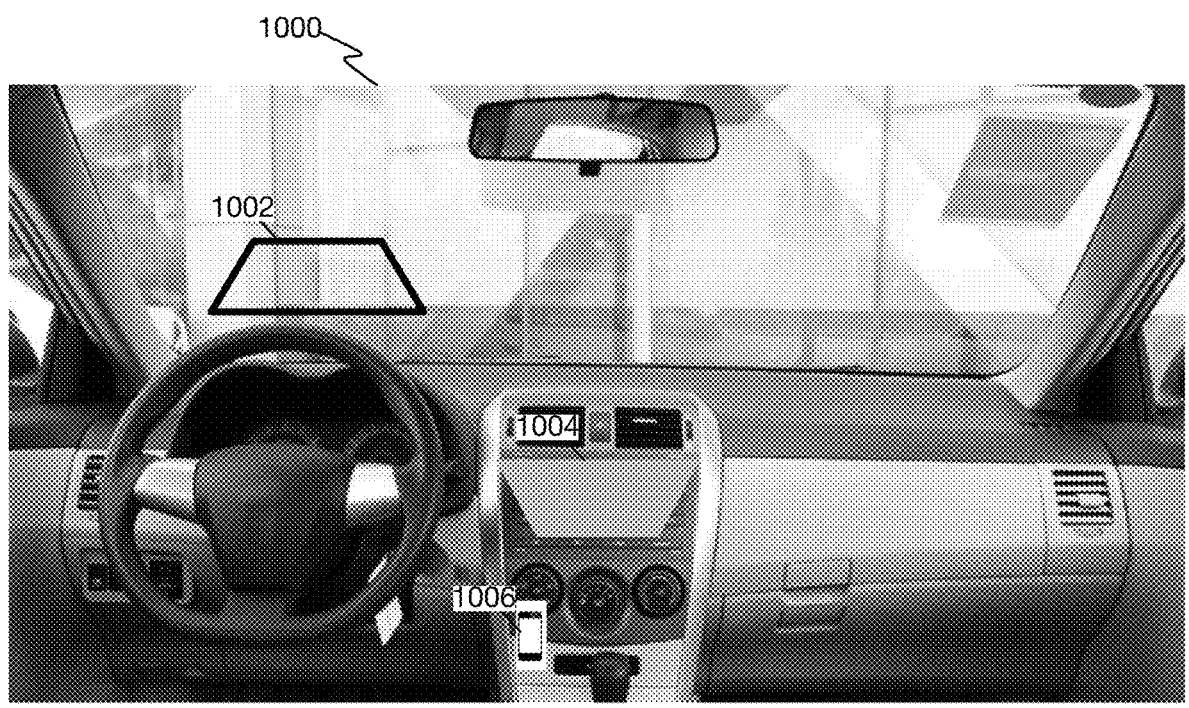
FIG. 10 is a picture of the interior of a transport in one embodiment of the present disclosure.

FIG. 10 is a picture of the interior of a transport in one implementation of the current application 1000. There are 3 areas wherein the simulation may be presented to the driver of a transport.

The first location is the Heads Up Display (HUD) 1002. The simulation may be shown in the HUD, paying particular attention to the safety aspects of the simulation causing a disruption in the normal driving functionality for the user.

In one embodiment, a notification is presented to the user wherein the user is required to either press a button to begin the simulation or press a button to dismiss the simulation.

In another embodiment, the simulation is executed only when the transport is in park or traveling a low rate of speed, such as below 10 miles per hour.

Additionally, the simulation may be presented in the transport's navigation/entertainment system 1004. Finally, the simulation may be presented on the user's client device, such as a mobile device 1006.

What is claimed is:

1. A method, comprising:
   determining a threat is associated with a device;
   developing a simulation to spread awareness of the threat;
   requesting, by the server, a permission to present the simulation to the device;
   determining, by the server, whether a response message is received from the device in response to the requesting; and
   executing the simulation, by the server, when a response is received which grants permission on the device, where the simulation utilizes a Remote Framebuffer (RFB) protocol and remotely controls a pointing device of the device to initiate, execution of the threat on the device, wherein the simulation includes data that simulates possible outcomes based on determining that the threat is not halted and enabling an user to take one or more safe actions.

2. The method of claim 1, wherein the simulation includes one or more of taking control of the device, via the server, wherein the mouse and keyboard inputs are controlled by the simulation, and displaying one or more of an animated presentation, a video presentation, and an image presentation.

3. The method of claim 1, wherein data of the requesting includes one or more of a URL link, and GUI components.

4. The method of claim 1, wherein the simulation, by the server, displays the simulation on the device.

5. A system, comprising: a processors and a memory storing instructions which when executed by the processor cause the processor to perform a method comprising:
   determine a threat associated with a device;
   develop a simulation to spread awareness of the threat;
   request, by the server, a permission to present the simulation to the device; determine, by the server, whether a response message is received from the device in response to the request; and
   execute the simulation, by the server, when a response is received which grants permission on the device, where the simulation utilizes a Remote Framebuffer (RFB) protocol and remotely controls a pointing device of the device to initiate execution of the threat on the device, wherein the simulation includes data that simulates possible outcomes based on determining that the threat is not halted and enabling an user to take one or more safe actions.

6. The system of claim 5, wherein the server is configured to one or more of take control of the device, wherein the mouse and keyboard inputs are controlled by the simulation, and display one or more of an animated presentation, a video presentation, and an image presentation.

7. The system of claim 5, wherein data of the request includes one or more of a URL link, and GUI components.

8. The system of claim 5, wherein the simulation, by the server, displays the simulation on the device.

9. A non-transitory computer readable medium comprising instructions, that when read by a processor, cause the processor to perform:
   determining a threat is associated with a device; developing a simulation to spread awareness of the threat;
   requesting, by the server, a permission to present the simulation to the device;
   determining, by the server, whether a response message is received from the device in response to the requesting; and executing the simulation, by the server, when a response is received which grants permission on the device, where the simulation utilizes a Remote Framebuffer (RFB) protocol and remotely controls a pointing device of the device to initiate execution of the threat on the device, wherein the simulation includes data that simulates possible outcomes based on determining that the threat is not halted and enabling an user to take one or more safe actions.

10. The non-transitory computer readable medium of claim 9, wherein the simulation includes one or more of taking control of the device, via the server, wherein the mouse and keyboard inputs are controlled by the simulation, and displaying one or more of an animated presentation, a video presentation, and an image presentation.

11. The non-transitory computer readable medium of claim 9, wherein data of the requesting includes one or more of a URL link, and GUI components.

12. The non-transitory computer readable medium of claim 9, wherein the simulation, by the server, displays the simulation on the device.

13. The method of claim 1, wherein the executing the simulation comprises remotely controlling the pointing device of the device to click on a component that causes a simulated virus to launch on the device.

14. The method of claim 1, wherein the executing the simulation further comprises displaying an identification of another device that is infected by the threat as a result of the simulation on the device.

* * * * *